United States Patent [19]

Lustig et al.

[11] 4,207,363

[45] Jun. 10, 1980

[54] FLEXIBLE HEAT-SHRINKABLE MULTILAYER FILM FOR PACKAGING PRIMAL MEAT

[75] Inventors: Stanley Lustig, Park Forest; John Anthony, Downers Grove, both of Ill.

[73] Assignee: Union Carbide Corporation, New York, N.Y.

[21] Appl. No.: 891,262

[22] Filed: Mar. 29, 1978

[51] Int. Cl.² ..................... B65D 25/06; B32B 27/08
[52] U.S. Cl. ........................ 428/35; 428/216; 428/517; 428/518; 428/910; 426/129
[58] Field of Search ............... 428/35, 517, 910, 216, 428/518

[56] References Cited

U.S. PATENT DOCUMENTS

| | | | |
|---|---|---|---|
| 3,634,552 | 1/1972 | Foglia | 260/897 A |
| 3,634,553 | 1/1972 | Foglia | 260/897 A |
| 3,673,050 | 6/1972 | Newman, Jr. et al. | 428/517 X |
| 3,741,253 | 6/1973 | Brax et al. | 428/520 X |
| 3,900,635 | 8/1975 | Funderburk et al. | 428/220 X |
| 4,078,020 | 3/1978 | Rose et al. | 260/897 A |

*Primary Examiner*—P. C. Ives
*Attorney, Agent, or Firm*—David Fink

[57] ABSTRACT

A heat-shrinkable multilayer film suitable for use in the packaging of primal meat cut, includes a first outer layer comprising a blend of a propylene-ethylene copolymer, a (butene-1)-ethylene copolymer, and a thermoplastic elastomer selected from the group consisting of ethylene-propylene copolymers and ethylene-propylene diene terpolymers; a first core layer connected to the first outer layer and being capable of being stretched during the biaxial orientation of the multilayer film and comprising an extrudable adhesive; a second core layer connected to the first core layer and serving as an oxygen barrier to protect the meat cut from spoilage and being compatible to the biaxial orienting and heat shrinking of the film; and a second outer layer comprising an ethylene vinyl acetate copolymer; the multilayer film being biaxially oriented.

19 Claims, No Drawings

FLEXIBLE HEAT-SHRINKABLE MULTILAYER FILM FOR PACKAGING PRIMAL MEAT

The present invention relates to a heat-shrinkable multilayer film, and more particularly to a heat-shrinkable multilayer film suitable for use in the packaging of a primal meat cut. In addition, the invention relates to a bag fabricated from the multilayer film.

Generally, a primal meat cut is a large cut of meat smaller than a side of beef but larger than a typical retail cut sold to a consumer. A primal meat cut is prepared at the slaughter house and then shipped to a retail store or institution such as a restaurant at which the primal meat cut is butchered into smaller cuts of meat.

It is the customary practice to package a primal meat cut for shipment so that the oxygen from the air is prevented from contacting the meat. This minimizes spoilage and discoloration of the meat.

It is known from the prior art for packaging meat cuts to use a film including a layer serving as an oxygen barrier to protect the meat from spoilage, such as a layer of polyvinylidene chloride copolymer. The other layers generally provide strength, abrasion resistance, and good low temperature properties.

Other important properties of suitable films include puncture resistance, heat shrink properties of from about 30% to about 50% at about 90° C. for both the machine and transverse directions, and resistance to delamination at elevated temperatures and during the heat shrinking.

Preferably, the film suitable for primal meat cuts should be capable of being heat sealable so that a bag can be fabricated from the film and the heat sealed seams should resist being pulled apart during the heat shrinking.

One prior art multilayer film is described in the U.S. Pat. No. 3,741,253 to Brax et al. Generally, the patent relates to a multilayer film comprising a first outside layer of an irradiated ethylene vinyl acetate copolymer, a core layer of polyvinylidene chloride copolymer, and a second outside layer of an ethylene vinyl acetate copolymer.

In addition to having desirable chemical and physical properties, the multilayer film must also be economical to manufacture and be suitable for commercial production. Typically, the process of manufacturing this type of oriented heat shrinkable film is a tubular orientation process wherein a primary tube of the film is biaxially oriented by stretching with internal pressure in the transverse direction and the use of pin rollers at different speeds in the machine direction. The multilayer film should provide a minimum of bubble breaks during production, and lend itself to production orientation processes.

The instant invention relates to a multilayer film which is relatively tough so that few rips occur during the orientation process and a small amount of waste is encountered during commercial production.

In accordance with the present invention, there is provided a heat-shrinkable multilayer film suitable for use in packaging a primal meat cut and suitable for fabricating a bag for use in packaging a primal meat cut, including a first outer layer comprising a blend of a propylene-ethylene copolymer having a high isotactic molecular structure with less than about 6% by weight ethylene and having a melt flow of from about 1.5 to about 18 decigrams per minute, a (butene-1)-ethylene copolymer having a high isotactic molecular structure with less than about 10% by weight being ethylene and having a melt flow of from about 0.1 to about 5.0 decigrams per minute, and a thermoplastic elastomer selected from the group consisting of ethylene-propylene copolymers and ethylene-propylene diene terpolymers, the ratio by weight of the propylene-ethylene copolymer to the (butene-1)-ethylene copolymer being from about 2:1 to about 1:2 and the thermoplastic elastomer being present in the amount of from about 10% to about 50% by weight; a first core layer connected to the first outer layer and being capable of being stretched during the biaxial orientation of the film and comprising an extrudable adhesive; a second core layer connected to the first core layer and serving as an oxygen barrier to protect the meat cut from spoilage and being compatible to the biaxial orienting and heat shrinking of the film; and a second outer layer comprising an ethylene vinyl acetate copolymer having a melt flow of from about 0.1 to about 1.0 decigrams per minute and having a vinyl acetate content of from about 10% to about 14% by weight; the multilayer film being biaxially oriented.

Generally, the propylene-ethylene copolymer for the invention can be prepared by a stereo-specific catalytic polymerization process which generally yields isotactic molecular structures containing up to about 6% by weight ethylene monomer copolymerized with propylene. Preferably, the propylene-ethylene copolymer should be a film grade resin having a density of from about 0.89 to about 0.91 gram per cubic centimeter. Preferably, the melt flow is from about 3.5 to about 12.0 decigrams per minute. Preferably the ethylene content should be at least about 2% by weight and more preferably about 4% by weight.

Generally, the (butene-1)-ethylene copolymers suitable for the invention may be produced by copolymerizing butene-1 and ethylene in the presence of stereospecific polymerization catalysts such as disclosed in the U.S. Pat. No. 3,629,940 and described in the aforementioned U.S. Pat. No. 3,634,552. The (butene-1)-ethylene copolymers for the invention are further characterized by a methylene absorption value of from about 0.001 to about 0.04 absorbance units per unit at a wave number of 720, and a DTA thermal peak value of at least 80° C. and in the range of 80° C. to 130° C. As used herein, DTA designates differential thermal analysis carried out by heating at a rate of rise of 5° C. per minute.

Preferably, the (butene-1)-ethylene copolymer contains from about 3% to about 6% by weight of ethylene.

While the weight ratio in the first outer layer for the propylene-ethylene copolymer to the (butene-1)-ethylene copolymer is from about 2:1 to about 1:2, a weight ratio of about 1:1 is preferable.

Generally, the ethylene-propylene copolymer elastomer for the invention includes at least about 50% by weight ethylene, preferably 70% by weight, and has a Mooney viscosity at 260° F. (ML 1+8 minutes) of from about 23 to about 50 centipoises.

The thermoplastic elastomer can also be an ethylenepropylene diene modified terpolymer. One commercially available ethylene terpolymer suitable for the invention but not food approved includes the E. I. du Pont de Nemours & Co. product sold under the tradename Nordel 1500. The Nordel 1500 is a terpolymer of ethylene, propylene and 1, 4 hexadiene having a specific density of about 0.85 and Mooney viscosity at 250° F. (ML 2+10) of about 58±6 centipoises.

The thermoplastic elastomer in the first outer layer imparts a surprising improvement in the shrink properties of the film and the presence of the thermoplastic elastomer results in the acceptable shrink properties of the film for temperatures less than about 100° C. The amount of the thermoplastic elastomer can be as high as about 50% by weight or even greater but the tackiness of the blend may be unacceptable at the higher levels. Preferably, the amount should be from about 20% to about 40% by weight.

The first core layer should be an extrudable adhesive capable of being stretched or biaxially oriented at the temperature to be used for biaxially orienting the multilayer film. Preferably, the adhesive should be a thermoplastic polymer. Generally, this temperature is determined by the temperature range suitable for biaxially orienting the first outer layer.

Preferably, the first core layer comprises an ethylene vinyl acetate copolymer having a melt flow of from about 0.1 to about 2.0 decigrams per minute and a vinyl acetate content of from about 12% to about 24% by weight. It is expected that a higher melt flow and vinyl acetate would improve adhesion between the first outer layer and the second core layer, however, it is believed that the higher values of melt flow and vinyl acetate content could tend to weaken the strength of the multilayer film.

The first core layer can include a small amount of an ionomer as a processing aid to improve the biaxial orientation of the ethylene vinyl acetate copolymer. The ionomer broadens the temperature range for the biaxial orientation of the first core layer.

Generally, suitable ionomers are disclosed in the U.S. Pat. No. 3,365,520 to Foster et al.

Preferably, the second core layer comprises a polyvinylidene chloride copolymer having at least about 50% by weight of a polymerized vinylidene chloride and containing a maximum of about 5% by weight of plasticizer. Generally, the balance of the polyvinylidene chloride copolymer is vinyl chloride, acrylonitrile, an acrylate ester such as methacrylate, or the like.

More preferably, the second core layer comprises a polyvinylidene chloride copolymer having from about 70% to about 90% by weight of a polymerized vinylidene chloride and a minimum of about 2% by weight of plasticizer.

Typically, the plasticizer can be a conventional plasticizer such as dibutyl sebacate and epoxidized soy bean oil.

Generally, the thickness of the multilayer film is from about 1.6 mils to about 4.4 mils, preferably about 2.4 mils. The first outer layer, preferably, has a thickness of from 0.4 mil to about 1.1 mils. A first core layer comprising an ethylene vinyl acetate copolymer, preferably, has a thickness of from 0.2 mil to about 0.5 mil. A second core layer of a polyvinylidene chloride copolymer, preferably, has a thickness of from about 0.3 mil to about 0.9 mil. The second outer layer of ethylene vinyl acetate, preferably, has a thickness of from about 0.7 mil to about 1.9 mils.

In general, various conventional additives such as slip agents, antiblocking agents, and pigments can be incorporated in the multilayer film in accordance with conventional practice.

The properties of the polymers described herein, unless otherwise indicated, have their properties determined in accordance with the following test methods.

Density—ASTM D-1505

Melt Flow—ASTM D-1238
  Propylene-ethylene copolymer—Condition L
  (Butene-1)-ethylene copolymer—Condition E
  Ethylene-propylene elastomer—Condition L
  Ethylene vinyl acetate copolymer—Condition E All percentages and parts given herein are by weight unless otherwise indicated.

Illustrative, non-limiting examples of the practice of the invention are set out below. Numerous other examples can readily be evolved in the light of the guiding principles and teachings contained herein. The examples given herein are intended to illustrate the invention and not in any sense to limit the manner in which the invention can be practiced.

The polymers shown in Table 1 are used in the examples:

TABLE 1

| Polymer | Melt Flow dg/min. | Density gm/cc | Description |
|---|---|---|---|
| EVA A | 0.3 | | Ethylene vinyl acetate copolymer; 12% by weight vinyl acetate; typically sold commmercially as EVA 3135 by E.I. du Pont de Nemours & Co. |
| EVA B | 0.7 | | Ethylene vinyl acetate copolymer; 18% by weight vinyl acetate; typically sold commercially as EVA 3165 by E.I. du Pont de Nemours & Co. |
| P-E A | 12.0 | 0.899 | Propylene-ethylene copolymer; typically sold commercially as PP 9818 by Diamond Shamrock |
| B-E A | 2.0 | 0.91 | (Butene-1)-ethylene copolymer; typically sold commercially as Witron 1200 by Witco Chemical Corp. |
| Elastomer A | | | Ethylene-propylene copolymer elastomer; typically sold commercially as Vistalon 702 by Exxon Chemical Co. |
| Elastomer B | | | Ethylene-propylene diene terpolymer elastomer; typically sold commercially as Telcar 303 by B. F. Goodrich Co. |
| Ionomer A | 1.4 | | 12% by weight ethylene-methacrylic acid copolymer with 13% conversion to a zinc salt; typically sold commercially as Surlyn 1650 by E.I. du Pont de Nemours & Co. |
| PVDC A | | | Polyvinylidene chloride copolymer; 83% by weight vinylidene chloride, 17% by weight vinyl chloride. |
| PVDC B | | | Polyvinylidene chloride copolymer 85% by weight vinylidene chloride, 15% by weight vinyl chloride. |

In accordance with conventional practice, the polyvinylidene chloride copolymer is formulated with a stabilizer, plasticizer, and lubricants generally in the proportion shown in Table 2.

TABLE 2

| Raw Material | Parts Per Hundred of PVDC |
|---|---|
| Epoxidized Soy Bean Oil (such as EPO or JPO | 1.0 |

TABLE 2-continued

| Raw Material | Parts Per Hundred of PVDC |
|---|---|
| both available from Union Carbide Corporation | |
| Plasticizer (such as Santicizer 141 available from Monsanto Chemical Co.) | 3.0 |
| Stabilizer | 0.5 |
| Lubricant | 0.5 |

EXAMPLE 1

A multilayer film was produced by conventional methods in accordance with the "double bubble" process such as described in the U.S. Pat. No. 3,555,604 to Pahlke by coextrusion of layers through a multilayer tubular die.

The layers of the film were:

| First Outer Layer |
|---|
| 40% P-E A |
| 40% B-E A |
| 20% Elastomer A |
| First Core Layer |
| 50% EVA A |
| 50% EVA B |
| Second Core Layer |
| PVDC A |
| Second Outer Layer |
| EVA A |

The film was produced by coextrusion of layers through a multilayer tubular die having a temperature of from about 320° F. to about 350° F. to form a primary tube having a diameter of about 2.6 inches and having a thickness of about 0.055 inch. The primary tube was cooled and flattened with a first pair of pinch rollers having a drive rate of from about 8 fpm to about 9 fpm and thereafter, the primary tube was continuously biaxially oriented by passing it through a cylindrical infrared heater and heating it slightly below its melting point and expanding the primary tube with air to about 4.5 times its diameter and stretching it to a similar degree with a second pair of pinch rollers rotating at a drive rate of about 42 fpm.

The film had a thickness of from about 2.3 mils to about 2.5 mils. The first outer layer was about 25% of the thickness, the first core layer was about 10% of the thickness, the second core layer was about 20% of the thickness, and the second outer layer was about 45% of the thickness.

EXAMPLES 2 to 8

Examples 2 to 8 are produced in accordance with the procedure given in Example 1. The composition of the layers for the Examples 2 to 8 are shown in the Table 3.

TABLE 3

| Example | First Outer Layer | First Core Layer | Second Core Layer | Second Outer Layer |
|---|---|---|---|---|
| 2 | 40% P-E A<br>40% B-E A<br>20% Elastomer A | 50% EVA A<br>50% EVA B | PVDC B | EVA A |
| 3 | 30% P-E A<br>30% B-E A<br>40% Elastomer A | 50% EVA A<br>50% EVA B | PVDC A | EVA A |
| 4 | 30% P-E A<br>30% B-E A<br>40% Elastomer A | 50% EVA A<br>50% EVA B | PVDC B | EVA A |
| 5 | 40% P-E A<br>20% B-E A<br>40% Elastomer A | 50% EVA A<br>50% EVA B | PVDC A | EVA A |
| 6 | 20% P-E A<br>40% B-E A<br>40% Elastomer A | 50% EVA A<br>50% EVA B | PVDC A | EVA A |
| 7 | 40% P-E A<br>40% B-E A<br>20% Elastomer B | 50% EVA A<br>50% EVA B | PVDC A | EVA A |
| 8 | 40% P-E A<br>40% B-E A<br>20% Elastomer A | 47.5% EVA A<br>47.5% EVA B<br>5% Ionomer A | PVDC B | EVA A |

A comparison of the properties of the films of Examples 1 to 8 are given in Table 4.

For the Table 4, the measurements for the percent of shrink at 90° C. for the machine direction (MD) and transverse direction (TD) are according to conventional procedures. The adhesion of the first outer layer to the second core layer is a measure of the quality of the first core layer. Production runs for the Examples 1 to 8 are excellent as to overcoming the problem of bubble breaks.

EXAMPLE 9

A bag is made from each of the tubular films of the Examples 1 to 8 by cutting a segment and heat sealing closed one of the open ends. The use of an ethylene vinyl acetate copolymer for the inner layer of the tubular film is advantageous in the formation of the bags because of the heat sealing properties.

Table 4

| Example | % Shrink at 90° C. MD | % Shrink at 90° C. TD | Adhesion of First Outer Layer to Second Core Layer | Production Without Bubble Breaks |
|---|---|---|---|---|
| 1 | 40 | 46 | excellent | excellent |
| 2 | 40 | 46 | excellent | excellent |
| 3 | 45 | 50 | excellent | excellent |
| 4 | 45 | 50 | excellent | excellent |
| 5 | 42 | 48 | excellent | excellent |
| 6 | 47 | 52 | excellent | excellent |
| 7 | 38 | 44 | excellent | excellent |
| 8 | 40 | 40 | good | excellent |

We wish it understood that we do not desire to be limited to the exact details shown and described, for obvious modifications will occur to a person skilled in the art.

Having described the invention, what we claim is new and desire to be secured by Letters Patent is as follows:

What is claimed is:

1. A flexible heat-shrinkable multilayer film adapted for use in the packaging of primal meat cut, consisting essentially of a first outer layer having a thickness of from about 0.4 mil to about 1.1 mil and comprising a blend of a propylene-ethylene copolymer having a high isotactic molecular structure with less than about 6% by weight ethylene and having a melt flow of from about 1.5 to about 18 decigrams per minute, a (butene-1)-ethylene copolymer having a high isotactic molecular structure with less than about 10% by weight being ethylene and having a melt flow of from about 0.1 to about 5.0 decigrams per minute, and a thermoplastic elastomer selected from the group consisting of ethylene-propylene copolymers and ethylene-propylene diene terpolymers, the ratio by weight of said propylene-ethylene copolymer to the (butene-1)-ethylene copolymer being from about 2:1 to about 1:2 and said thermoplastic elastomer being present from about 10% to about 50% by weight;

a first core layer having a thickness of from about 0.2 mil to about 0.5 mil and connected to said first outer layer and being capable of being stretched during the biaxial orientation of the multilayer film and comprising an extrudable adhesive;

a second core layer having a thickness of from about 0.3 mil to about 0.9 mil and connected to said first core layer and serving as an oxygen barrier to protect the meat cut from spoilage and being compatible to the biaxial orienting and heat shrinking of said film; and a second outer layer having a thickness of from about 0.7 to about 1.9 mil and comprising an ethylene vinyl acetate copolymer having a melt flow of from about 0.1 to about 1.0 decigrams per minute and having a vinyl acetate content of from about 10% to about 14% by weight; said multilayer film being biaxially oriented.

2. The film of claim 1 wherein the ratio by weight of said propylene-ethylene copolymer to said (butene-1)-ethylene copolymer is about 2:1.

3. The film of claim 1, wherein the ratio by weight of said propylene-ethylene copolymer to said (butene-1)-ethylene copolymer is about 1:1.

4. The film of claim 1, wherein the ratio by weight of said propylene-ethylene copolymer to said (butene-1)-ethylene copolymer is about 1:2.

5. The film of claim 1, wherein said propylene-ethylene copolymer has a density of from about 0.89 to about 0.91 gram per cubic centimeter.

6. The film of claim 1, wherein said propylene-ethylene copolymer has a melt flow of from about 3.5 to about 12.0 decigrams per minute.

7. The film of claim 1, wherein the amount of said thermoplastic elastomer is from about 20% to about 40% by weight.

8. The film of claim 1, wherein said thermoplastic elastomer comprises an ethylene-propylene copolymer elastomer.

9. The film of claim 8, wherein said ethylene-propylene copolymer elastomer comprises ethylene in the amount of at least 50% by weight.

10. The film of claim 9, wherein said ethylene-propylene copolymer elastomer comprises ethylene in the amount of about 70% be weight.

11. The film of claim 10, wherein said ethylene-propylene copolymer elastomer has a Mooney viscosity at 260° F. of from about 23 to about 50 centipoises.

12. The film of claim 1, wherein said thermoplastic elastomer comprises an ethylene-propylene diene modified terpolymer.

13. The film of claim 1, wherein the ratio by weight of said propylene-ethylene copolymer to said (butene-1)-ethylene copolymer is about 1:1 and said thermoplastic elastomer is present from about 20% to about 40% by weight.

14. The film of claim 1, wherein said first core layer is a thermoplastic polymer.

15. The film of claim 1, wherein said first core layer comprises an ethylene vinyl acetate copolymer having a melt flow of from about 0.1 to about 2.0 decigrams per minute and having a vinyl acetate content of from about 12% to about 24% by weight.

16. The film of claim 1, wherein said second core layer comprises a polyvinylidene chloride copolymer.

17. The film of claim 1, wherein said first outer layer has a thickness of from about 0.4 mil to about 1.1 mil; said first core layer has a thickness of from about 0.2 mil to about 0.5 mil; said second core layer has a thickness of from about 0.3 to about 0.9 mil; and said second outer layer has a thickness of from about 0.7 mil to about 1.9 mils.

18. The film of claim 6, wherein said first core layer comprises an ethylene vinyl acetate copolymer having a melt flow of from about 0.1 to about 2.0 decigrams per minute and a vinyl acetate content of from about 12% to about 24% by weight and said second core layer comprises a polyvinylidene chloride copolymer.

19. A bag fabricated from the film of claim 1.

* * * * *

UNITED STATES PATENT AND TRADEMARK OFFICE
CERTIFICATE OF CORRECTION

PATENT NO. : 4,207,363
DATED : June 10, 1980
INVENTOR(S) : Stanley Lustig et al.

It is certified that error appears in the above—identified patent and that said Letters Patent is hereby corrected as shown below:

On The Title Page, "19 Claims, No Drawings" should read

-- 18 Claims, No Drawings --.

Signed and Sealed this

Twenty-eighth Day of October 1980

[SEAL]

Attest:

SIDNEY A. DIAMOND

Attesting Officer

Commissioner of Patents and Trademarks